US010674394B2

(12) United States Patent
Shi et al.

(10) Patent No.: US 10,674,394 B2
(45) Date of Patent: Jun. 2, 2020

(54) METHOD AND APPARATUS FOR REDUCING NETWORK LATENCY

(71) Applicant: Futurewei Technologies, Inc., Santa Clara, CA (US)

(72) Inventors: Hang Shi, Fremont, CA (US); Ulas Can Kozat, Mountain View, CA (US); Yinghua Ye, Los Gatos, CA (US); Zhipeng Hou, Beijing (CN); Huida Dai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 181 days.

(21) Appl. No.: 15/796,183

(22) Filed: Oct. 27, 2017

(65) Prior Publication Data

US 2019/0132767 A1    May 2, 2019

(51) Int. Cl.
*H04W 28/02* (2009.01)
*H04W 24/08* (2009.01)
*H04W 84/04* (2009.01)

(52) U.S. Cl.
CPC ....... *H04W 28/0289* (2013.01); *H04W 24/08* (2013.01); *H04W 84/042* (2013.01)

(58) Field of Classification Search
CPC ............. H04W 28/0289; H04W 24/08; H04W 84/042
See application file for complete search history.

(56) References Cited

U.S. PATENT DOCUMENTS

| 8,239,565 B2* | 8/2012 | Irino ...................... H04L 47/10 709/225 |
| 2015/0127760 A1* | 5/2015 | Hsieh .................... H04L 43/026 709/207 |

(Continued)

FOREIGN PATENT DOCUMENTS

| CN | 102404187 A | 4/2012 |
| CN | 104125159 A | 10/2014 |
| CN | 104734872 A | 6/2015 |

OTHER PUBLICATIONS

Cardwell, Neal, et al., "BBR Congestion-Based Congestion Control", *acmqueue*, 14(5), (2016), 34 pgs.

(Continued)

*Primary Examiner* — Chi H Pham
*Assistant Examiner* — Weibin Huang
(74) *Attorney, Agent, or Firm* — Schwegman Lundberg & Woessner, P.A.

(57) ABSTRACT

A protocol independent network condition service (PINCS) apparatus is provided, comprising a memory storage comprising instructions and one or more processors in communication with the memory. The processors execute the instructions to receive a subscription for network condition information of at least one network from at least one network condition consumer (NCC) node, the network condition information being related to at least one target data flow provided to at least one node in the network via the NCC node, obtain information about a plurality of network conditions from at least one network condition provider (NCP) node configured to monitor a plurality of network conditions including network conditions related to the at least one target data flow, process the information about the plurality of network conditions to generate an aggregated network conditions information, and send the aggregated network conditions information the NCC node as indicated by the subscription.

19 Claims, 8 Drawing Sheets

(56) References Cited

U.S. PATENT DOCUMENTS

| | | | |
|---|---|---|---|
| 2016/0134512 A1* | 5/2016 | Geng | H04L 45/125 |
| | | | 709/238 |
| 2016/0212050 A1* | 7/2016 | Yin | H04L 45/54 |
| 2017/0155930 A1* | 6/2017 | Park | H04N 21/8456 |
| 2017/0156106 A1* | 6/2017 | Chen | H04L 43/0882 |
| 2017/0359242 A1* | 12/2017 | Zavesky | H04L 45/48 |
| 2019/0281466 A1* | 9/2019 | Zhang | H04W 16/04 |

OTHER PUBLICATIONS

Jain, A., et al., "Mobile Throughput Guidance Inband Signaling Protocol", Internet Engineering Task Force, (Mar. 13, 2017), 16 pgs.

Szilagyi, Peter, et al., "Mobile Content Delivery Optimization based on Throughput Guidance", IETF 93, IRTF ICCRG, Prague, (Jul. 22, 2015), 17 pgs.

"International Application No. PCT/CN2018/111197, International Search Report and Written Opinion dated Jan. 4, 2019", (Jan. 4, 2019), 9 pgs.

* cited by examiner

FIG. 8

METHOD AND APPARATUS FOR REDUCING NETWORK LATENCY

TECHNICAL FIELD

The present disclosure is related to methods and apparatus for reducing latency in a communication system.

BACKGROUND

The evolution of Internet and mobile communications in the past two decades has fundamentally changed our daily life in almost every aspect from society, politics, and economics to culture, entertainment, and education. Proposals to provide high-bandwidth and low-latency wireless communications include proposals for a fifth generation (5G) wireless network to succeed the current 4G standard. As currently proposed, 5G provides higher bandwidth with much higher device density. The proposed 5G networks may be useful for implementing new applications such as online augmented reality (AR), remote surgery, internet of things (IoT), and vehicle to vehicle (V2V) communication.

SUMMARY

According to one aspect of the present disclosure, there is provided apparatus in a network including a processing system configured to implement a protocol independent network condition service (PINCS) node, the processing system being configured to: receive a subscription for network condition information of at least one network from at least one network condition consumer (NCC) node, the network condition information being related to at least one target data flow provided to at least one node in the network via the NCC node; obtain information about a plurality of network conditions from at least one network condition provider (NCP) node configured to provide a plurality of network conditions including network conditions related to the at least one target data flow; aggregate the information about the plurality of network conditions; and send the aggregated information about the plurality of network conditions to the NCC node, as indicated by the subscription.

Optionally, in the preceding aspect, the information of the plurality of network conditions includes information concerning multiple data flows, including the at least one target data flow, the multiple data flows operating according to a plurality of protocols.

According to one aspect of the present disclosure, there is provided a protocol independent network condition service (PINCS) apparatus, comprising: a non-transitory memory storage comprising instructions; and one or more processors in communication with the memory, wherein the one or more processors execute the instructions to: receive a subscription for network condition information of at least one network from at least one network condition consumer (NCC) node, the network condition information being related to at least one target data flow provided to at least one node in the network via the NCC node; obtain information about a plurality of network conditions from at least one network condition provider (NCP) node configured to monitor a plurality of network conditions including network conditions related to the at least one target data flow; process the information about the plurality of network conditions to generate an aggregated network conditions information; and send the aggregated network conditions information the NCC node as indicated by the subscription.

Optionally, in the preceding aspect, the information of the plurality of network conditions includes information concerning multiple data flows, including the at least one target data flow, the multiple data flows operating according to a plurality of protocols.

Optionally, in any of the preceding aspects, the network condition information includes at least one of: a radio bandwidth, a round trip time (RTT), a bearer queue length, a flow queue length, a bearer queue depletion rate, or a flow queue depletion rate.

Optionally, in any of the preceding aspects, the processing system is configured to receive respective subscriptions from a plurality of NCC nodes related to a respective plurality of data flows and to receive the network condition information from a plurality of network condition providers.

Optionally, in any of the preceding aspects, the processing system is a component of a network exposure function of a fifth generation (5G) system.

Optionally, in any of the preceding aspects, the processing system is coupled to a mobile edge computing (MEC) system including a MEC server and the processing system and the MEC server are in separate locations.

Optionally, in any of the preceding aspects, the processing system is coupled to a mobile edge computing (MEC) system including a MEC server and the processing system and the MEC server are co-located.

Optionally, in any of the preceding aspects, the processing system is configured to receive side information from a Node B such as radio channel and quality of service (QoS) aware segmentation of the momentary cell capacity and S1 interface, throughput, loss, queue length, average queue depletion rate, and delay.

According to another aspect of the present disclosure, there is provided a network condition consumer (NCC) apparatus, comprising: a non-transitory memory storage comprising instructions; and one or more processors in communication with the memory, wherein the one or more processors execute the instructions to: send a subscription for network condition information of at least one network to a protocol independent network condition service (PINCS) node, the network condition information being related to at least one target data flow provided to at least one node in the network by a source node coupled to the NCC node; obtain information about a plurality of network conditions from the PINCS node as indicated in the subscription; and apply the information about the plurality of network conditions to control network congestion and to reduce latency for the target data flow from the source node.

Optionally, in the preceding aspect, the NCC node is collocated with the source node and the processing system is configured to implement the congestion control in network transport.

Optionally, in any of the preceding aspects, the processing system is configured to implement rate control.

Optionally, in any of the preceding aspects, the processing system is configured to implement buffer control.

Optionally, in any of the preceding aspects, the NCC node is separate from the source node and the processing system is configured to send the information about the plurality of network conditions to the source node using in-band signaling.

Optionally, in any of the preceding aspects, the NCC node is separate from the source node and the processing system is configured to send the information about the plurality of network conditions to the source node using out-of-band signaling.

Optionally, in any of the preceding aspects, the network conditions in the subscription include at least one of: a radio bandwidth, a round trip time (RTT), a bearer queue length, a flow queue length, a bearer queue depletion rate, or a flow queue depletion rate.

According to yet another aspect of the present disclosure, there is provided a network condition provider (NCP) apparatus, comprising: a non-transitory memory storage comprising instructions; and one or more processors in communication with the memory, wherein the one or more processors execute the instructions to: periodically obtain network condition information about a plurality of data flows provided to one or more UE devices from a radio access technology (RAT) device; receive, from a protocol independent network condition service (PINCS) node, a request for information about network conditions related to at least one flow of the plurality of data flows; and periodically send the requested information to the PINCS node.

Optionally, in the preceding aspect, the NCP node is collocated with the RAT device and is configured to directly monitor the data flows provided by the RAT device to the one or more UE devices.

Optionally, in any of the preceding aspects, the NCP node is separate from the RAT device and collects the network condition information by periodically sending probe packets to the RAT device and monitoring responses to the probe packets received from the RAT device.

Optionally, in any of the preceding aspects, the probe packets include polling requests for information maintained by the RAT device.

According to yet another aspect of the present disclosure, there is provided a method for implementing a Protocol Independent Network Condition Service (PINCS), the method comprising: receiving a subscription for network condition information of at least one network from at least one network condition consumer (NCC) node, the network condition information being related to at least one target data flow provided to at least one node in the network via the NCC node; obtaining information about a plurality of network conditions from at least one network condition provider (NCP) node configured to monitor a plurality of network conditions including network conditions related to the at least one target data flow; process the information about the plurality of network conditions to generate an aggregated network conditions information; and send the aggregated network conditions information the NCC node as indicated by the subscription.

Optionally, in the preceding aspect, the information of the plurality of network conditions includes information concerning multiple data flows, the multiple data flows operating according to a plurality of protocols.

Optionally, in any of the preceding aspects, the network condition information includes at least one of radio bandwidth, round trip time (RTT), bearer queue length, flow queue length, bearer queue depletion rate, flow queue depletion rate.

Optionally, in any of the preceding aspects, the method further includes receiving respective subscriptions from a plurality of NCC nodes related to a respective plurality of target data flows; receiving the network condition information from a plurality of network condition providers; and maintaining the network condition information from the plurality of network condition providers in the list.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown by way of illustration specific embodiments which may be practiced. These embodiments are described in sufficient detail to enable those skilled in the art to practice the subject matter described below, and it is to be understood that other embodiments may be utilized and that structural, logical, and electrical changes may be made consistent with the present description. The following description of example embodiments is, therefore, not to be taken in a limited sense, and the scope of the described subject matter is defined by the appended claims.

Ultra-low latency applications, such as augmented reality (AR), remote surgery, internet of things (IoT), and vehicle to vehicle (V2V) communication benefit from reductions in end-to-end delay. Mobile edge computing (MEC) has recently been proposed as a means to push content and applications from remote servers to mobile network edges (e.g. enhanced NodeBs (eNBs) or next generation NodeBs (gNBs)) to reduce latency between a request for content and the delivery of that content. Thus, the MEC system may have a MEC server collocated with the eNB or gNB, for example, at a central office (CO) of the network.

Moving content servers to the edge, however, does not address all of the latency issues in the edge network, because queueing delay is the dominant cause of end to end latency in cellular networks. Such queueing delay is also called bufferbloat. End-to-end latency in many existing Internet applications is the result of bufferbloat. Typically, routers include buffers to absorb traffic bursts, and avoid loss of data. Bufferbloat occurs as a consequence of excessively large buffers at network devices, especially at routers, which cause significant delay. In mobile networks, bufferbloat exists in both radio access network (RAN) and core network (CN) functions. Existing mechanisms in buffer control and/ or congestion/rate control/avoidance, such as additive-increase/multiplicative-decrease (AIMD) algorithm, are loss based and so do not focus on reducing round-trip time (RTT).

In MEC, various edge resources are co-located, such as core network entities like distributed gateway (DGW), over the top (OTT) entities such as streaming servers, and radio access network (RAN) entities. Using this architecture, it may be possible to perform cooperative edge resource scheduling among OTT, RAN and core network entities. The feedback from various entities such as user equipment (UE), DGW, and RAN can be used to facilitate edge resource scheduling to minimize queuing delays in mobile networks without sacrificing spectral efficiency and statistical multiplexing gain while reducing end-to-end delay for ultra-low latency services. Such a cooperative resource scheduling approach complements the existing efforts, such as content delivery network (CDN), MEC, and control and user plane separation (CUPS), helps in business collaboration opportunities in edges between network operators and OTT entities, and allows building differentiated subscriber service pipes for OTT entities to create value added opportunities.

Figure 1:
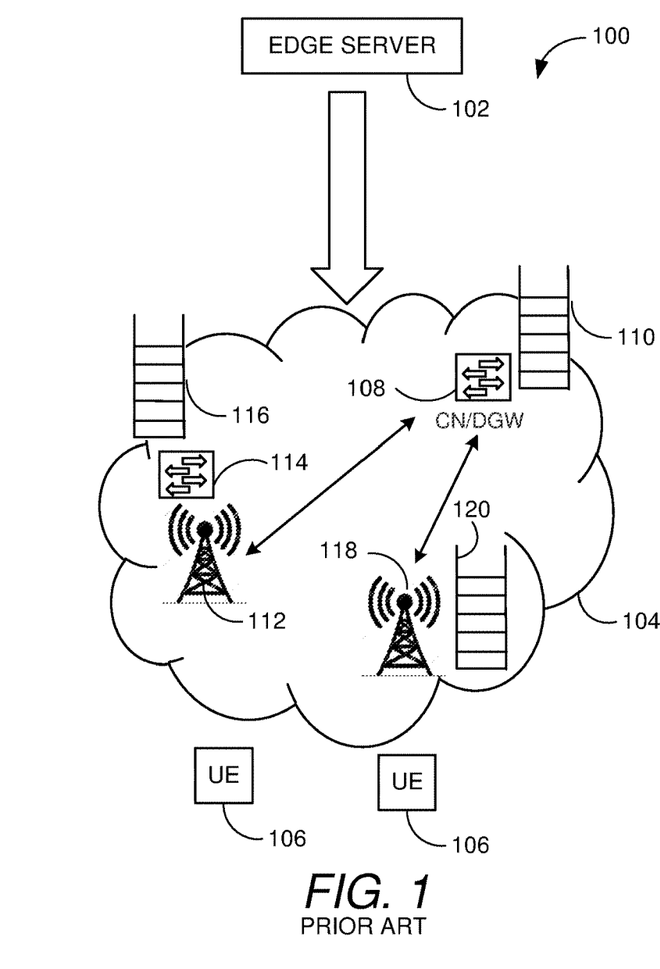
FIG. 1 shows a prior art communication network.

FIG. 1 shows a prior art communication network 100 having multiple nodes, including an edge server 102, a core network/distributed gateway (CN/DGW) 108, a RAT 112, a DGW 114, and a RAN 118. The edge server 102 communicates via a wireless network 104 with the CN/DGW 108, the RANs 112 and 118 and, via the RAN 112, with the DGW 114. The nodes 108, 112, 114 and 118, in turn, communicate with a plurality of UEs 106. The UEs 106 may be smart phones or tablet devices, or other types of devices including, without limitation, Internet video players, IoT devices, virtual reality (VR) devices, or V2V devices.

As shown in FIG. 1, each of the DGW 114, CN/DGW 108, and RAT device 118 includes a respective buffer 116, 110 and 120. These buffers temporarily hold data to be provided to applications running on the UEs 106. Buffering of the data is handled on an application-by-application basis, with little or no regard to the state of the communication network 100. As described above, the buffers 116, 110 and 120 may be relatively large in order to prevent data loss. Depending on the status of the communication network 100, the buffer may add significant latency to one or more of the applications running on the UEs 106.

For example, multiple UEs 106 running video players may request separate high-resolution video streams. The bandwidth used to transmit the streams from the devices 108, 112, and/or 118 may be greater than the available bandwidth in the respective radio link. In this instance, data may back up in the queue and none of the users of the UEs 106 will have a satisfactory experience.

In 1979 Leonard Kleinrock showed that an optimal operating point at the bandwidth delay product (BDP), both for individual connections and for the network 100 as a whole, can be determined as shown in equation (1).

$$BDP = (\max BW) * (\min RTT) \quad (1)$$

Thus the BDP is at the maximum bottleneck bandwidth and minimum RTT. In practice however the BDP may be difficult to determine because it may be difficult to measure RTT/delay and bottleneck bandwidth together. One method of utilizing BDP is the bottleneck bandwidth and round-trip time (BBR) proposed by Google which seeks high throughput with small queue size by probing bottleneck bandwidth (BW) and RTT sequentially. The BBR method models the network path and dynamically estimates max BW and min RTT on each acknowledgment message (ACK) received via the network path. The method controls the rate at which data is sent from the source to the application based on the model. The method uses probe measurements of max BW and min RTT to feed the model samples and attempts to maintain a data rate near the estimated BW to reduce queues and loss.

BBR, however, considers only a single session at a time and may have a weak convergence rate because there may be too much external dependency in its model. Furthermore, BBR may have difficulty getting accurate BW and RTT estimates for the fluctuating links of a wireless network. These links may fluctuate due to: packet loss in the air interface, fluctuations in cellular transmission capability, dynamics of users (e.g. their flows, mobility, and associated delay changes), proprietary packet buffering mechanisms in base station and gateways, and interference from quality of service (QoS) mechanisms implemented in the RAN and CN nodes.

Thus, while benefits may be gained by operating network communications or sessions at a derived BBR value, using estimates of max BW and min RTT, difficulty in obtaining such estimates in wireless networks may reduce the actual efficiency and accuracy of BBR when being deployed in mobile networks.

One approach may be to provide help from the network side to assist in obtaining the BW and RTT estimates used in BBR. More specifically, embodiments below describe a protocol independent network condition service (PINCS) node to be used by the traffic source. The PINCS node controls the source servers to send packets at a rate to minimize queuing delay within the path. A data driven mechanism in the PINCS node considers network congestion data from multiple sources (that may use different protocols) to obtain real-time scheduling data. The embodiments described below complement existing rate control mechanisms implemented at the transport level and/or application level.

Figure 2:
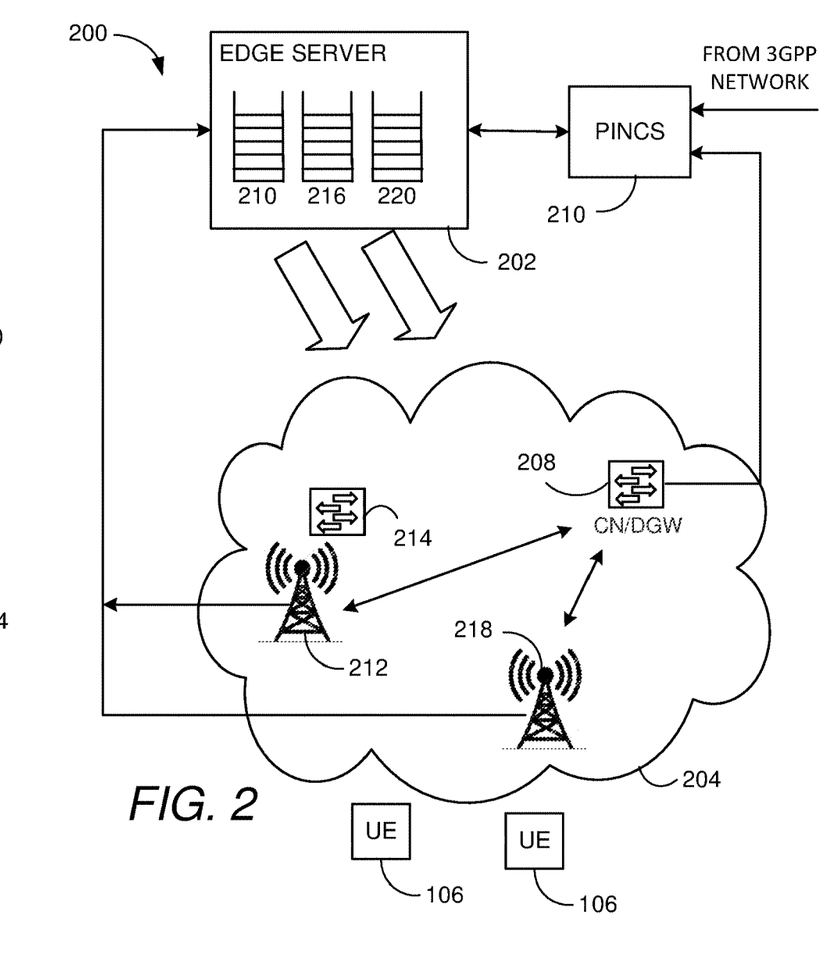
FIG. 2 is a block diagram of an example embodiment of a system, according to the subject disclosure.

FIG. 2 is a block diagram showing a communication network 200 according to an embodiment. The communication network 200 includes a PINCS node 210, a DGW 214, a CN/DGW 208 and RAT devices 212 and 218. The example PINCS node 210 receives network status data from the 3GPP network 204 (e.g. the CN/DGW 208) and also receives network usage data from an edge server 202. The edge server 202, which may be a MEC server, in turn receives usage data from the RAT devices 212 and 218. The RAT devices 212 and/or 218 in some examples comprise eNBs or gNBs. The communication network 200 includes queues 210, 216, and 220 for the CN/DGW 208, the DGW 214, and the RAT device 218, respectively. The queues 210, 216, and 220, however, are located in the edge server 202. Although the queues 210, 216, and 220 are located at the edge server 202, it is contemplated that the RAT device 212, DGW 214, CN/DGW 1208 and/or RAT device 218 may also have local queues. As described below, however, delays through these queues may be much less than the delays through the queues 110, 116 and 120 shown in FIG. 1.

As shown in FIG. 2, a single PINCS node 210 may be used to collect and distribute network status information from a single network 204 or from multiple networks. An additional network may include additional nodes (e.g. DGWs and RAT devices) as well as an additional edge server. For the sake of clarity, the connections among these additional elements are not shown in FIG. 2. In this example configuration, the PINCS node 210 receives, consolidates, and distributes network condition information from both the network 104 and any additional networks.

Although the examples below describe the PINCS node 210 as being implemented in a wireless network 204, it is contemplated that similar principles may be used to reduce latency in wired networks, including optical networks, and/or in networks that include both wired and wireless nodes.

The example PINCS node 210 serves as an intelligence center that collects information from multiple sources, conducts analysis and computation, and provides a secure interface for accessing and obtaining network conditions, such as BW and delay. The PINCS node 210 may also consider side information from the eNB/gNB such as radio channel and QoS aware segmentation of the momentary cell capacity and S1. Side information includes information such as throughput, loss, queue length, average queue depletion rate, and delay. The PINCS node 210 may also receive information from one or more network condition providers (NCP) nodes and one or more network condition consumers (NCC) nodes, as described below.

A network congestion controller in some embodiments includes a protocol independent network condition service (PINCS) node, a network condition consumer (NCC) node, and a network condition provider (NCP) node. The PINCS node receives a subscription for network condition information of at least one network from the NCC node and obtains information about a plurality of network conditions from the NCP node. The PINCS node aggregates the information about the plurality of network conditions and sends the aggregated information about the plurality of network conditions to the NCC node as indicated by the subscription. The NCC node applies the subscribed network condition information to implement congestion control, rate control and/or buffer control in the network.

Figure 3:
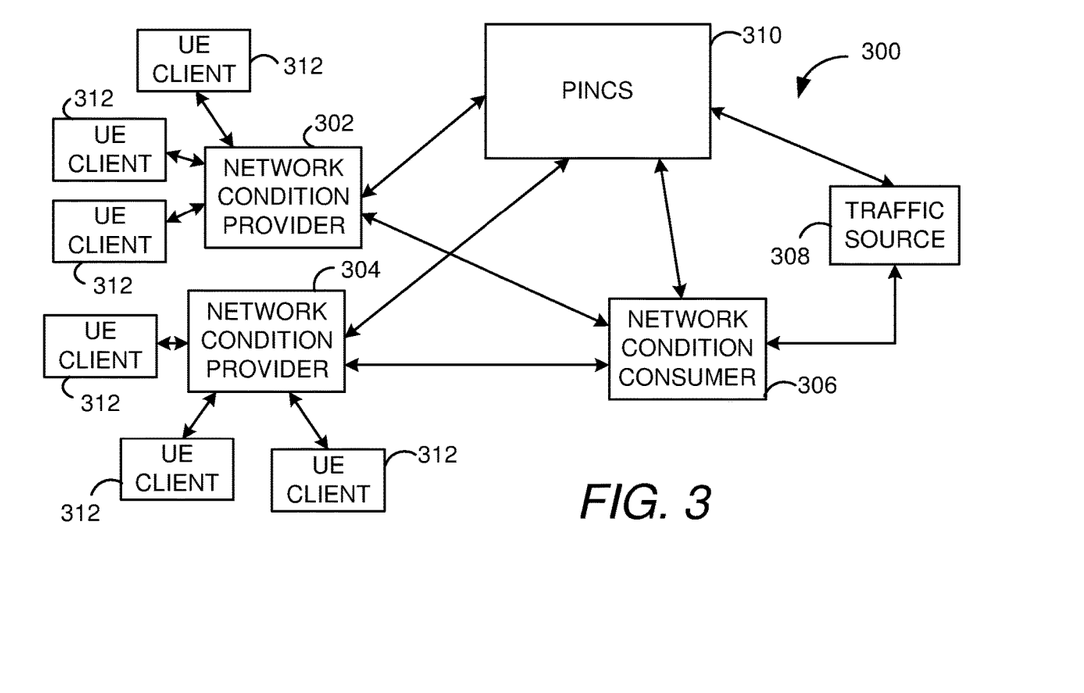
FIGS. 3, 4A, and 5A are block diagrams of example embodiments of systems, according to the subject disclosure.

FIG. 3 is a block diagram of an example PINCS node implementation. The system 300 shown in FIG. 3 includes a PINCS node 310, a traffic source node 308, a NCC node 306, and two NCP nodes 302 and 304. In this example, each NCP node 302, 304 serves three UE clients 312. It is contemplated that there may be multiple traffic source nodes 308, multiple NCC nodes 306 and multiple NCP nodes 302, 304 and that each node may serve more or fewer than three UE clients. The PINCS node 310 receives information about the condition of the network from the NCP nodes 302 and 304 and provides the information to the NCC node 306 and/or to the traffic source node 308. Using this information, the traffic source 308 node and/or NCC node 306 control the flow of data to the UE clients 312 in order to reduce latency for the available bandwidth as indicated by the network condition information.

Each example NCP node 302, 304 establishes a secure channel with the PINCS node 310. The NCP node 302, 304 can be an in-line entity such as a baseband unit (BBU) or external entity such as a probe agent. A probe agent may, for example, obtain network condition information by periodically sending probe packets to the BBU and monitoring responses received from the BBU. Alternatively, the probe agent may poll the BBU with requests for network condition information maintained by the BBU, such as radio bandwidth and queue length for both the bearer queues and the flow queues. The NCP node 302, 304 may periodically provide network condition information to the PINCS node 310, or may provide information when it is requested.

An in-line NCP node 302, 304 (such as a BBU) collects information such as radio bandwidth, delay (e.g. RTT), and, for each per-bearer and/or per-flow queue, queue length and average depletion rate of the queue. The NCP node 302, 304 sends the collected data to the PINCS node 310. An external NCP node 302, 304 probes or polls the network elements to collect throughput, delay and/or loss information and sends the collected information to the PINCS node 310.

Each example NCC node 306 may also establish a secure channel with the PINCS node 310 and provide information on the condition of the network at the transport level to the PINCS node 310. An example NCC node 306 can run in direct mode or indirect mode. In direct mode, a traffic source 308 uses the condition information to control congestion at the transport level or to ensure that the application level encoding/decoding scheme is appropriate for the current network capability. In indirect mode, an intermediate node adds network condition information in protocol specific format, such as in the option header of TCP session to notify a TCP sender to adjust the data rate (e.g. TCP extended data option (EDO)).

The example PINCS systems described below allow for flexible implementation. The NCP node 302, 304 can be an inline or external provider node, the NCC node 306 can run in direct or indirect mode, and the PINCS function can be deployed in the application layer or as congestion/rate control in the transport layer.

Due to its protocol independence, the example PINCS systems can be used in different scenarios to assist in congestion control, rate control, slow start, and/or to control other aspects of data dissemination using the network.

In one example, a PINCS system can help with congestion control for TCP. Operating in direct mode at a TCP source, a TCP sender such as the traffic source 308 subscribes to receive specified traffic information from the PINCS node 310. The TCP source 308 uses the information from PINCS node 310 to implement congestion control, slow start, and packet pacing.

In another example, the PINCS node 310, operating in indirect mode, implements in-line processing at the gateway. One or more in-line components of the gateway, such as the policy and charging enforcement function (PCEF), becomes the NCC node 306 and subscribes to receive data from the PINCS node 310. The gateway 306 adds an option header in the TCP session to notify the TCP sender to adjust the data rate for example, using TCP-EDO.

In yet another example, the protocol independent nature of the PINCS node 310 allows this service to be used by congestion control modules in one or more other protocols. For example in a user datagram protocol (UDP) session, a UDP sender (e.g. traffic source 308) may subscribe to congestion data from the PINCS node 310. In this instance, the information from PINCS node 310 may be used to adjust the sending rate to implement rate control in the application (e.g. to control the video/content delivery rate).

In another example, the PINCS node 310 may be used in direct mode, at the application source. In this example, an application may subscribe to services from the PINCS node 310. Information from the PINCS node 310 may be used by an application running on the traffic source and/or one or more of the servers to perform initial content selection and media rate adaptation.

Figure 4A:
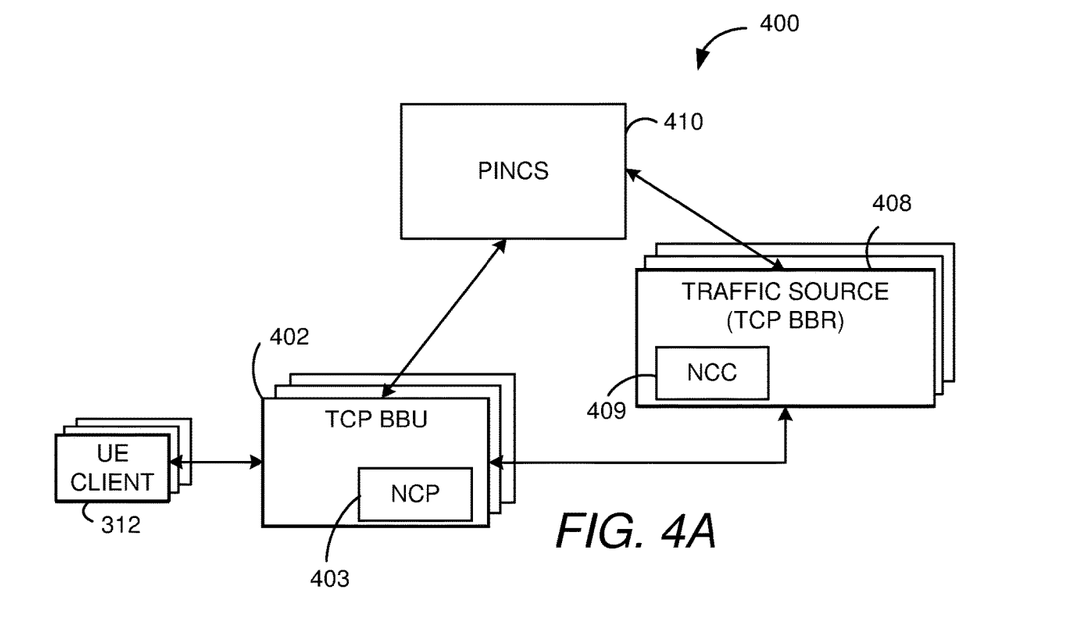

The following describes several example scenarios in which the PINCS node 310 can be used. FIG. 4A is a block diagram of an example embodiment which includes a PINCS node 410, one or more traffic sources 408, each including an NCC node 409, one or more TCP baseband units (BBUs) 402, each including an NCP node 403, and one or more UEs 312. Operation of the each of the elements 402, 403, 408, 409, and 410 is described below with reference to the flowcharts 4B, 4C and 4D. The example system 400 uses an NCC node 409 running in direct mode at the TCP Source 408. In this example, the NCC node 409 runs TCP BBR (bottleneck bandwidth and RTT). It is contemplated, however, that a similar architecture and flow may be used for other congestion control mechanisms, such as, without limitation, Cubic, Vegas and Tahoe, and/or for other transport layer protocols and/or application layer rate control mechanisms with or without BBR Similarly, although the embodiments are described as using one or more BBUs that uses TCP to communicate with the one or more UEs 312, it is contemplated that the BBU may use other protocols such as, without limitation, user datagram protocol (UDP), datagram congestion control protocol (DCCP), stream control transmission protocol (SCTP), and may be implemented in a number of RAT devices such as, without limitation, a base station, a gateway, an access point, an a micro node, a pico-node, a femto-node, an eNB and/or a gNB may be used for the data flow between the BBU and the UE 312.

Furthermore, although not shown in FIG. 4A, the network may include intermediate nodes between the traffic source node 408 and the BBU 402. In this instance, the NCC node 409 (associated with the traffic source node 408) may subscribe to and receive network condition information about the intermediate nodes as well as about the BBU node 402.

Figure 4B:
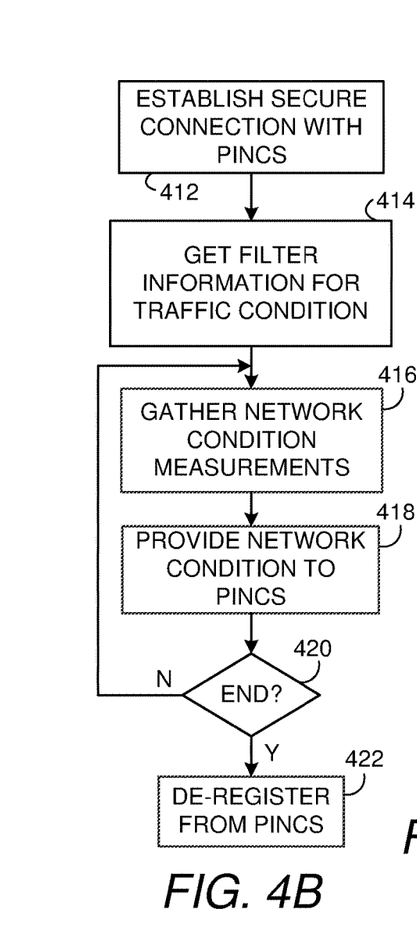
FIGS. 4B, 4C and 4D are flow-chart diagrams showing operations performed by components of the example system shown in FIG. 4A.

FIG. 4B is a flowchart showing operations performed by an example NCP node 403, such as the NCP node 403 in the BBU node 402, shown in FIG. 4A. At block 412, the NCP node 403 registers and establishes a secure channel with the PINCS node 410. The NCP node 403, at block 414 optionally receives filter information from the PINCS node 410 via the secure channel. In some embodiments, the filter information indicates the traffic data to be monitored by the NCP node 403. For example, information to be monitored may identify a target data flow of interest and request the bandwidth, delay, queue length, and/or queue depletion rate for the target data flow as well as an indication of the quality of the channel between the BBU 402 and the UEs 312 used by the target data flow. Because the latency of the target data flow may depend on other data flows being processed by the BBU node 402, the NCP node 403 may provide network condition information for multiple data flows operating according to multiple protocols (e.g. TCP, UDP, datagram congestion control protocol (DCCP), flow control transmission protocol (SCTP), etc.), as well as the number and type of applications being serviced by the BBU 402. Alternatively or in addition, the NCP node may provide similar condition information for different bearers.

Once the information to be collected is determined, the NCP node 403 gathers the requested network condition measurements (block 416) and sends (block 418) the measurements to the PINCS node 410. At block 420, the NCP node 403 of the BBU 402 determines if it needs to terminate collecting network conditions. An NCP node 403 may terminate its operation, for example, when a user command is received to terminate operations of the PINCS node 410 or when no NCC node 409 subscribes to network condition information monitored by the NCP node 402. When, at block 420, the NCP node 403 determines that the network conditions are to continue to be collected, control transfers to block 416 to continue to take network condition measurements. When the NCP node 403 terminates operations at block 420, it de-registers from the PINCS node 410 at block 422.

Figure 4C:
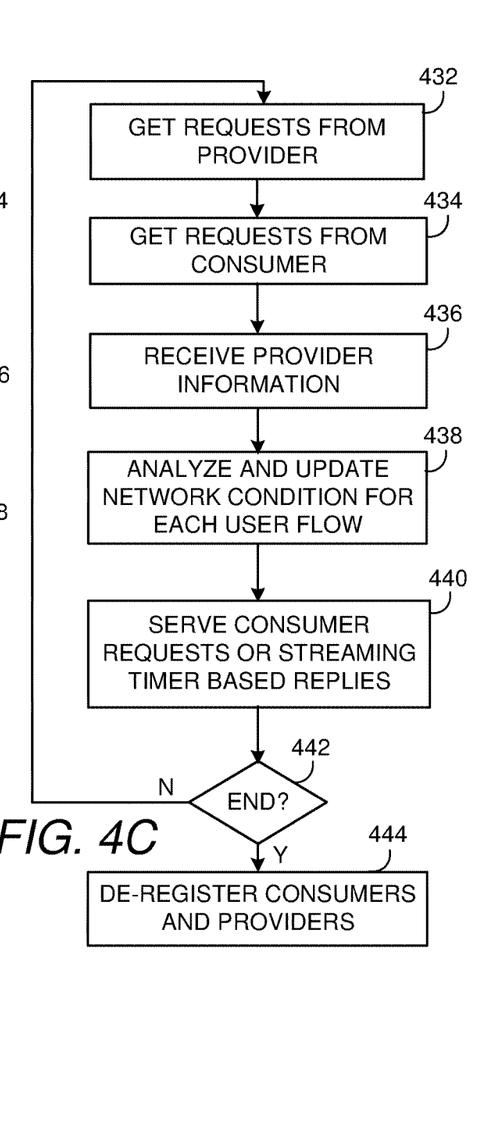

FIG. 4C is a flowchart diagram showing the operation of an example PINCS node 410. At block 432, the PINCS node 410 receives registration requests from one or more NCP nodes 403. In block 432, the PINCS node 410, based on subscription requests from the NCC nodes 409, may also send, to the NCP nodes 403, filter data indicating particular flows, bearers and/or network condition parameters to be monitored. At block 434, the PINCS node 410 receives registration requests and subscriptions for specific network condition data from one or more NCC nodes 409. At block 436, the PINCS node 410 receives network condition information from the NCP nodes 403. The example PINCS node 410 builds a list containing this information at block 438 and updates the network conditions in the list based on the monitored user flows. In response to the subscription requests, the PINCS node 410 provides requested data to the NCC nodes 409 at block 440. The subscription requests from the NCC nodes 409 may be for specific data or may indicate an ongoing request such as a streaming timer for one or more data streams. At block 442, PINCS node 410 determines whether to stop serving the NCC nodes 409, for example in response to a global termination command or because all of the NCC nodes 409 have terminated their subscriptions. The PINCS node 410 continues providing services by transferring control to block 432, described above. When, at block 442, the PINCS node 410 stops serving the NCC nodes 409 and de-registers the NCC nodes 409 and NCP nodes 403 at block 444.

Figure 4D:
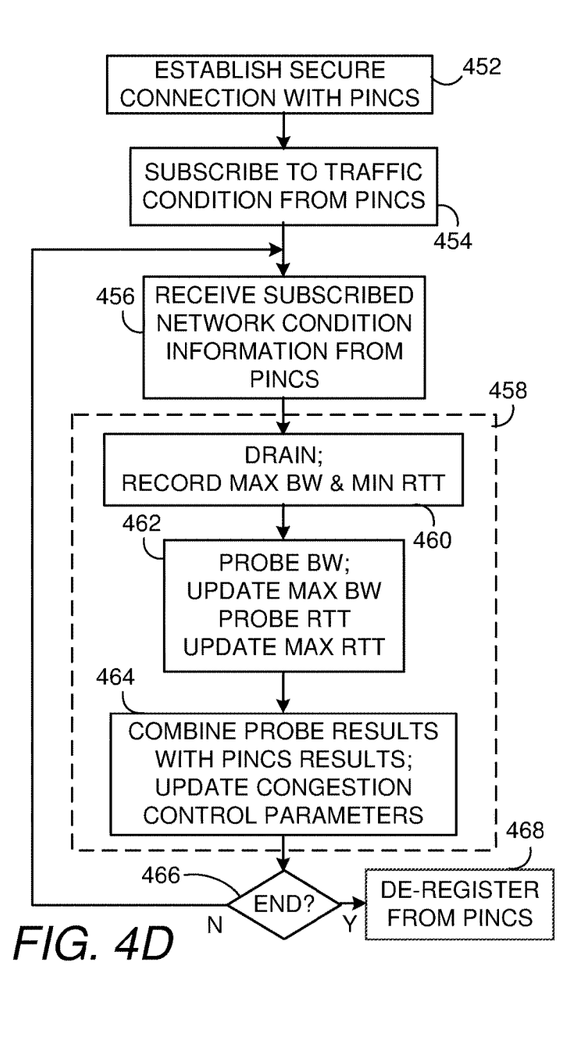

FIG. 4D is a flowchart diagram showing the operation of an example NCC node 409, shown in FIG. 4A. At block 452, the NCC node 409 establishes a secure channel with the PINCS node 410. The NCC node 409 then subscribes to receive specific traffic condition information from the PINCS node 410. The subscribed traffic conditions may depend on the types of data flows being provided by the traffic source 408. For example, if the traffic source is a streaming video source, the NCC node 409 may subscribe to receive RTT, bandwidth, queue length and queue length depletion rate from the NCP nodes 403 that are monitoring the streaming video being provided to the UEs 312. Alternatively, for TCP applications, the requested information may include the TCP 5-tuple (source IP address/port number, destination IP address/port number and the protocol in uses) with a request to monitor bandwidth and queues linked to the bearer channel indicated by the 5-tuple.

At block 456, the NCC node 409 receives the subscribed network condition information from the PINCS node 410. Next, at blocks 460, 462, and 464, which are combined as block 458, the example NCC node 409 implements BBR control based on the data to adjust the data source toward the maximum bandwidth and minimum latency for the flows subscribed to by the NCC node 409. The NCC node 409 can perform a better BBR control than is presently performed because it has access to network condition information for all of the applications served by a traffic source through multiple BBUs. This network condition information is independent of the protocol being used.

The example BBR control of block 458 is for a TCP application and includes, at step 460, monitoring draining of the buffers and recording the maximum bandwidth and minimum round-trip time while the buffer is drained. At block 462, the NCC node 409 may also receive the probe bandwidth data and probed RTT data from the NCP nodes 403, via the PINCS node 410. Also at block 462, the NCC node 409 may update the maximum bandwidth and maximum RTT measurements based on the received probe data. At block 464, the NCC node 409 updates the congestion control parameters for the traffic source 408 based on the probe results and the PINCS node 410 results according to the BBR control.

While the NCC node 409 is shown as implementing a BBR control, it is contemplated that other types of control may be used for other protocols. For a video streaming protocol, for example, the NCC node 409 may subscribe to the queue length and bandwidth of the access point that is providing data to the UE 312 and increase the frame rate or resolution of the video when the queue length decreases and/or the bandwidth increases and decrease the frame rate or resolution of the video when the queue length increases and/or the bandwidth decreases. It is contemplated that the information collected by the PINCS node 410 may be low-pass filtered and/or that the NCC node 409 may apply hysteresis to prevent rapid changes in the data rates from causing rapid changes in the BBR control.

At block 466, the NCC node 409 branches to block 456 if it continues to update the congestion control parameters and branches to block 468 otherwise. At block 468, the NCC node 409 terminates its operations and de-registers from the PINCS node 410.

Figure 5A:
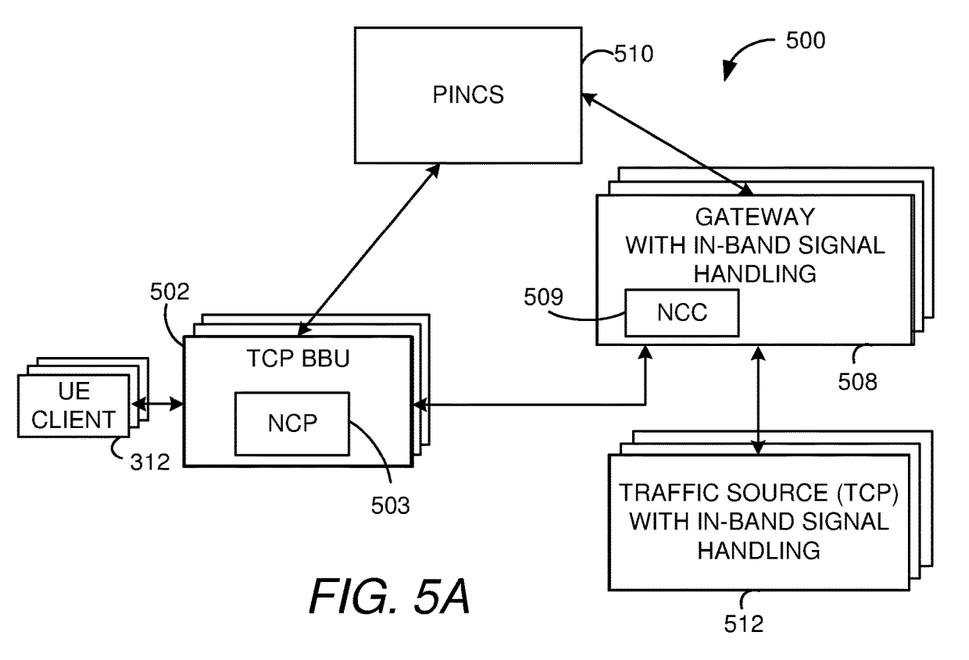

FIG. 5A is a block diagram of another example embodiment of the system 500. The example system 500 includes a PINCS node 510, one or more TCP traffic source nodes 512, one or more TCP gateway nodes 508, at least some of the TCP gateway nodes 508 including respective NCC nodes 509, one or more TCP BBU nodes 502 including respective NCP nodes 503, and one or more UE clients 312. In the system 500, the NCC node 509 runs in indirect mode at the TCP gateway node 508. In this embodiment, the gateway adds in-band signal handling (e.g. TCP option headers) to carry network condition information that the TCP source 512 uses to implement congestion control.

Figure 5B:
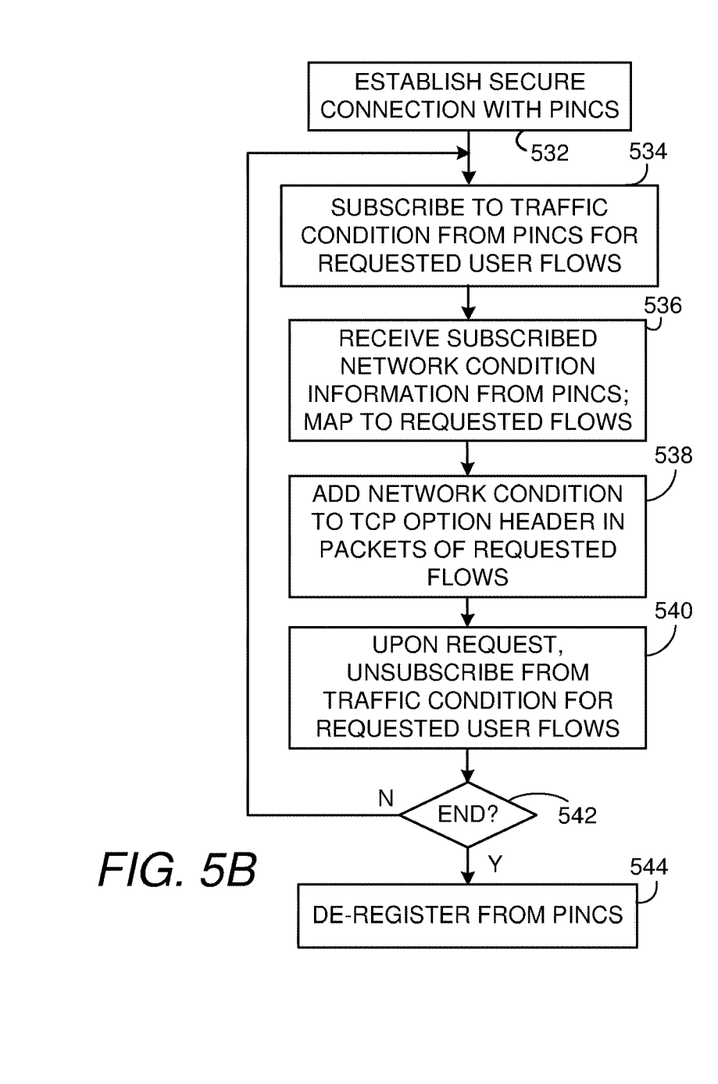
FIGS. 5B and 5C are flow-chart diagrams that showing operations performed by the example system shown in FIG. 5A.
Figure 5C:
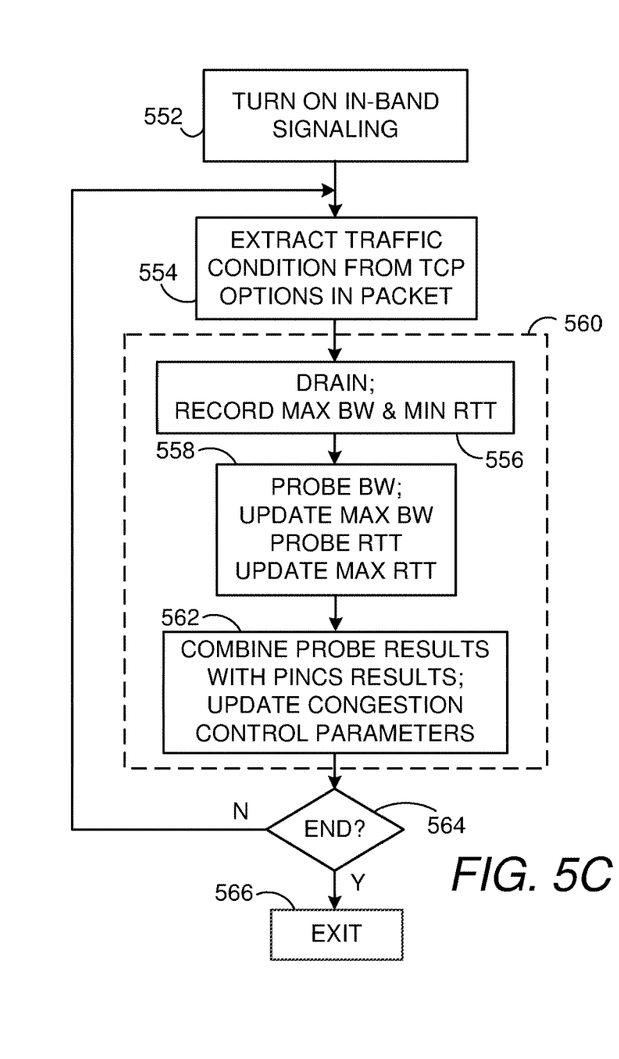

FIG. 5B is a flowchart diagram showing operations of the example NCC node 509 implemented in the TCP gateway node 508 and FIG. 5C is a flowchart diagram showing operations of the example traffic source 512. The operation of the NCP node 503 and PINCS node 510 is the same as for the NCP node 403 and PINCS node 410 described above and these devices are not further described herein.

At block 532 of FIG. 5B, the NCC node 509 establishes a secure channel with the PINCS node 510. In block 534, the NCC node 509 subscribes to traffic conditions from the PINCS node 510 for requested user data flows. As described above, the subscribed traffic conditions may depend on the types of data flows being provided by the traffic source 512 and/or the bearers used by these flows. The example system shown in FIG. 5A uses a TCP protocol, thus the subscribed information may include information on bandwidth and queues for a channel and/or bearer indicated by a TCP 5-tuple.

After receiving the subscribed information from the PINCS node 510, the NCC node 509, in block 536, maps the information to the flows identified by the traffic source 512. At block 538, the NCC node 509 adds the network condition information to TCP option headers of the requested flows and sends the information to the traffic source 512. The network condition information may be inserted into TCP acknowledgment packets for the data flows. At block 540, the NCC node 509 unsubscribes from the traffic conditions for the user flows if requested to do so. The NCC node 509, at block 542, determines whether to continue collecting control information for the traffic source 512. If it is to continue, the NCC node 509 branches to block 534 to add or change subscriptions with PINCS node 510 to the traffic condition information for the requested user flows. If the NCC node 509 determines, at block 542, not to continue collecting control information, block 544 deregisters the NCC node 508 from the PINCS node 510.

FIG. 5C is a flowchart diagram showing operations of the example traffic source node 512 shown in FIG. 5A. At block 552, the traffic source 512, if it is using in-band signaling, turns on the in-band signal. Next, at block 554, the traffic source 512 extracts the traffic condition information from the TCP options header received from the NCC/gateway node 508.

In block 560, the example traffic source 512 implements buffer control/rate control/congestion control using BBR. In block 556, the traffic source 512 drains the buffers for the traffic flows being controlled and records of the maximum bandwidth and minimum round-trip time while the buffers are drained. At block 558, the traffic source 512 may receive the probed bandwidth data and probed RTT data from the NCC/gateway node 509 via the PINCS node 510. Also at block 558, the traffic source 512 may update the maximum bandwidth and maximum RTT measurements based on the received probe data. At block 562, the traffic source 512 updates the congestion control parameters according to BBR.

At block 564, the traffic source 512 branches to block 554 if it continues to update the congestion control parameters, and branches to block 566 otherwise. At block 566, the traffic source 512 terminates its operations and de-registers from the PINCS node 510.

As described above, with reference to FIG. 4D, while the traffic source 512 is shown as implementing a BBR control, it is contemplated that other types of control may be used.

The example systems shown in FIGS. 4A and 5A use in-band signaling to send information in the TCP packets. It is contemplated, however, that out-of-band signaling may be used instead of or in addition to in-band signaling. In-band feedback may not be efficient in terms of delay. As described above, in-band signaling may be forwarded to the client using TCP packets and then be sent back to server using ACK packets. Uplink scheduling of the ACK packets, however, may result in unexpected delays. Out-of-band signaling may be much faster and typically is not forwarded to the client. Out-of-band signaling, however, may use at least one extra session per TCP session to implement the controls.

Figure 6:
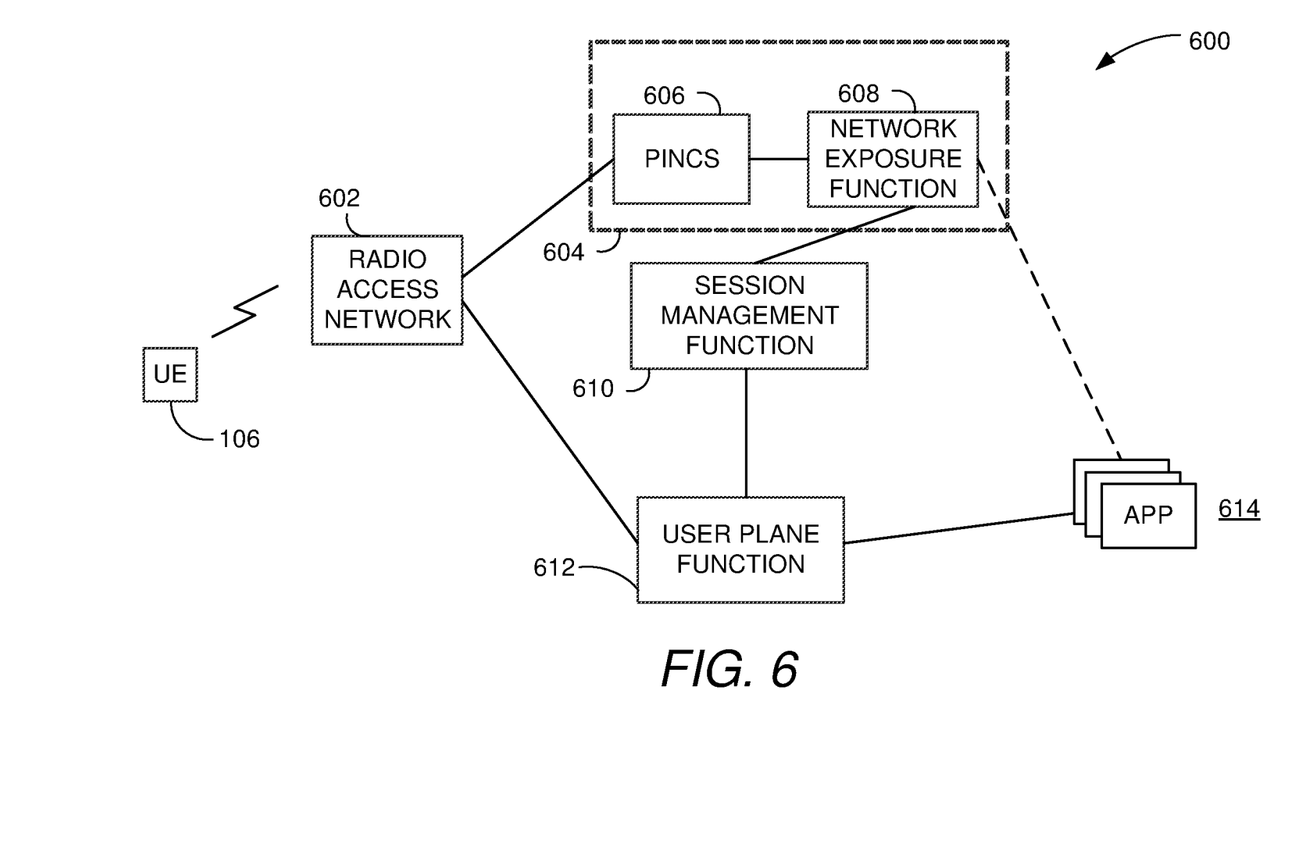
FIG. 6 is a block diagram of an example embodiment of the system in a 5G environment.

FIG. 6 is a block diagram of an example embodiment in a 5G communication network 600. As shown in FIG. 6 the PINCS node 606 is coupled to receive NCP node data from the radio access network (RAN) node 602, which serves one or more UEs 106. The PINCS node 606 is also coupled to a network exposure function 608. As shown in FIG. 6, the PINCS node 606 and the network exposure function 608 may be co-located in a single server 604 in some embodiments. Two possible methods can be used for implementing network control in the 5G network 600.

In the first method, which corresponds to the indirect method described above, the PINCS node 606 provides the network condition information to a session management function 610 via the network exposure function 608. The session management function 610, acting as the NCC node, controls the user plane function 612 to adjust the rates at which data from the applications 614 are provided to the radio access network 602.

In a second method, which corresponds to the direct method described above, the network exposure function 608 provides the network condition data from the PINCS node 606 directly to the applications 614, which perform the functions of the NCC nodes described above to implement the network control functions directly and provide data to the radio access network 602 through the user plane function 612.

FIGS. 7A, 7B, 7C, and 7D are block diagrams of alternative embodiments of the system in a mobile edge computing (MEC) environment. In a MEC environment, the distributed gateway (DGW) 704 is located in the edge along with traffic source applications 706.

Figure 7A:
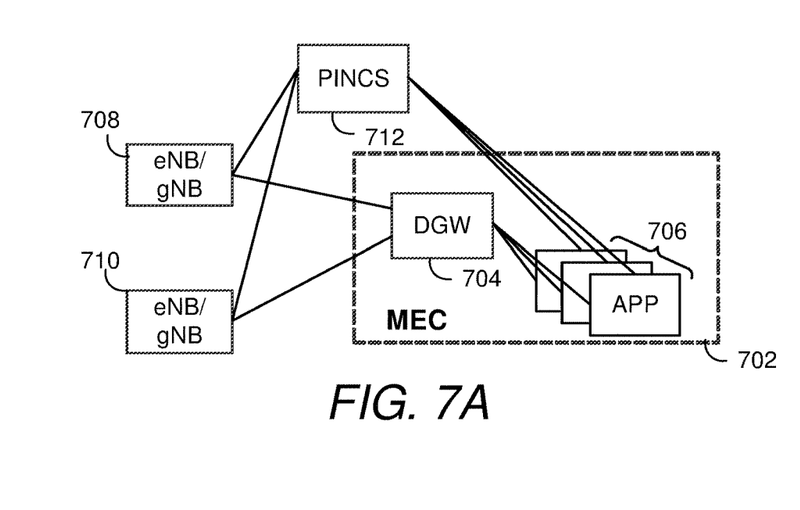
FIGS. 7A, 7B, 7C, and 7D are block diagrams of alternative embodiments of the system in a mobile edge computing (MEC) environment.

In the example embodiment shown in FIG. 7A, the eNBs/gNBs 708 and 710 perform the functions of the BBUs with a NCP node as described above with reference to FIG. 4A. The eNBs/GNBs 708 and 710 receive parameters describing information to be gathered from the data flows provided to the UEs (not shown in FIG. 7A) and provides this information to the PINCS node 712. In this embodiment, the PINCS node 712 is not co-located with the MEC server 702. The PINCS node 712 may be located in a separate enclosure within the same facility or at the CN or other location remote from the MEC server. The PINCS node 712, in turn, provides the network condition information to the APPs 706, which use the information to implement the network control functions. This embodiment corresponds to the direct mode, described above with reference to FIGS. 4A-4D.

Figure 7B:
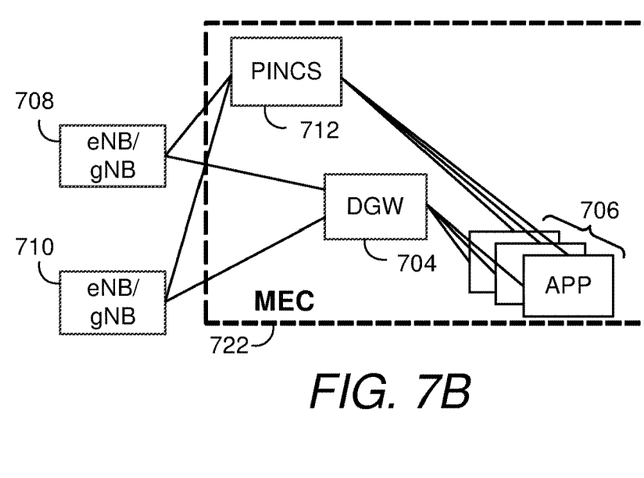

The embodiment shown in FIG. 7B also implements the direct mode. It differs from the embodiment shown in FIG. 7A in that the PINCS node 712 is located at the edge, with the MEC server 742. In the embodiment of FIG. 7B, the hardware used to implement the PINCS node 712 may consume valuable space in the MEC enclosure. Thus, the embodiment in FIG. 7A may be preferential where space at the edge is limited.

Figure 7C:
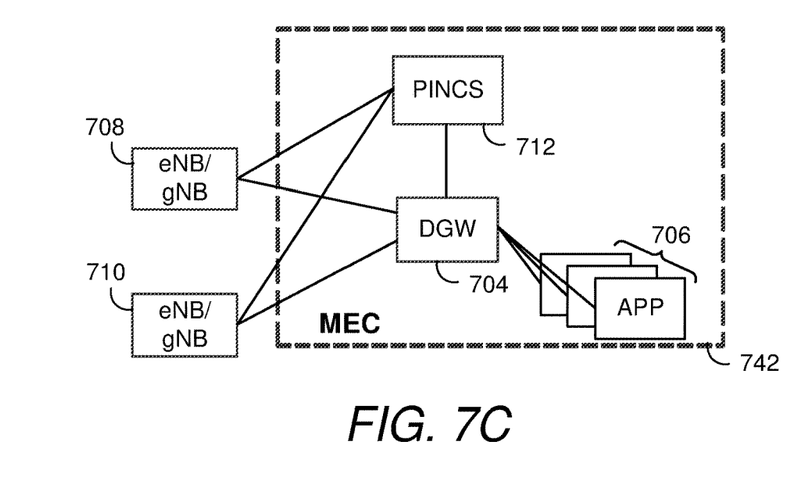
Figure 7D:
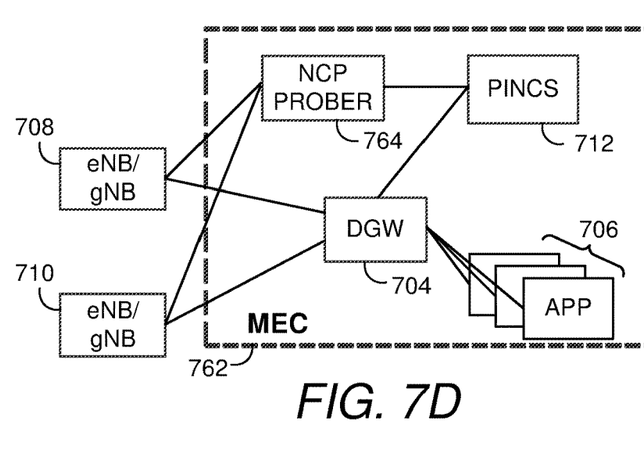

FIGS. 7C and 7D are block diagrams of alternative embodiments that operate in indirect mode, as described above with reference to FIGS. 5A-5C. In these embodiments, the respective PINCS 712 are collocated with the MEC servers 722 and 762 and the functions of the NCC node are implemented in the DGWs 704. In the example embodiment shown in FIG. 7C, the DGW/NCC node 704 subscribes to and receives network condition information from the PINCS node 712 and sends the control information to the APPs 706 via in-line signaling, as described above.

The example embodiment shown in FIG. 7D differs from the embodiment of FIG. 7C by the addition of the NCP prober 764. In this embodiment, the eNB/gNBs 708 and 710 are not modified to include the NCP functionality. Instead, the NCP prober 764 interacts with the eNBs/gNBs 708 and 710 to obtain the requested network condition data. The NCP prober 764, for example, may send status request messages to the eNBs/gNBs 708, 710 to obtain the information or may send null packets to the UE devices through the eNBs/gNBs 708 and 710 and monitor the resulting ACK packets to determine latency and bandwidth. The NCP information generated by the prober 764 is provided to the PINCS node 712 which, in turn, provides subscribed information to the DGW/NCC node 704. As in the embodiment of FIG. 7C, the network condition information is provided by the DGW/NCC node 704, which sends the network condition information to the APPs 706 using in-line signaling to implement the network control functions.

Although FIGS. 7C and 7D show the PINCS node 712 as located in the MEC enclosure, and FIG. 7D shows the NCP prober 764 located in the MEC enclosure, it is contemplated that either or both of these devices may be located external to the MEC.

The NCP nodes described above provide network condition information that may include more than queue length and bandwidth because queue length and bandwidth may not reflect delays caused by scheduling at the BBU. For example, a queue having a length of 10 packets may experience more delay when there are many active users than when there are few active users and thus, no competition for the queue.

Some embodiments also provide average depletion rate of the queue and queue length, which may be better network condition signals. Average depletion rate reflects both queuing and scheduling delay while queue length represents the occupancy of queue.

As described above, measurements made by from BBU are sent to another entity—the PINCS node—to be processed. Processing the measurements provided by the BBU in the PINCS node avoids adding extra functionality in the BBU and thus avoids incurring additional processing delay due to the added functionality.

The PINCS node, or another processing element coupled to the PINCS node, may include a model of a scheduler. By gathering measurements from the BBU, the PINCS node (or other processing element) is able to process and digest the measurements and give the final feedback to the servers without significantly affecting network throughput.

The functions or algorithms described herein may be implemented using software, in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a processing system such as a digital signal processor, application specific integrated circuit (ASIC), microprocessor, mainframe processor or other type of processor operating on a computer system, such as a personal computer, server or other processing system, turning such processing system into a specifically programmed machine.

Figure 8:
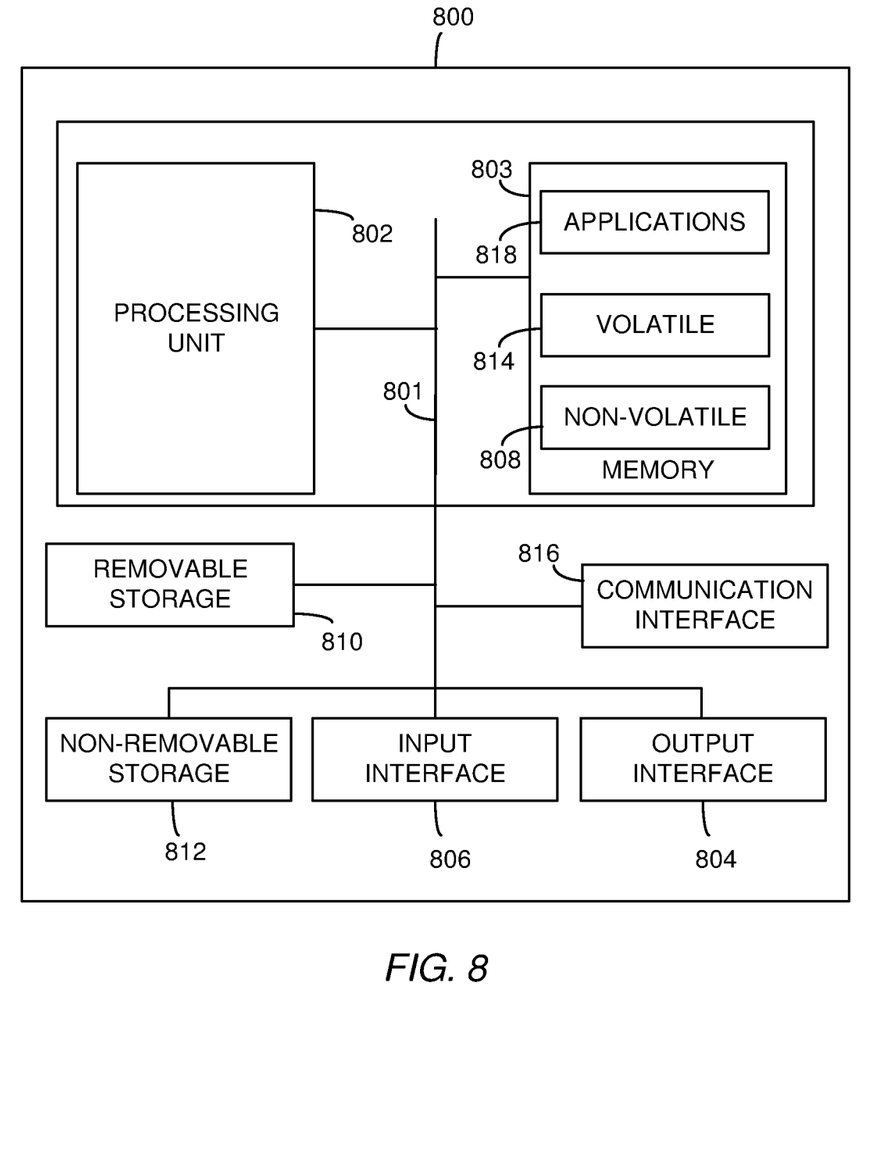
FIG. 8 is a block diagram of an example processing system that may be used in example embodiments.

FIG. 8 is a block diagram of example processing circuitry for clients, servers, and cloud based processing system resources for implementing algorithms and performing methods according to example embodiments. The distributed processing system may include multiple instances of the circuitry shown in FIG. 8 which may be used to implement any of the elements/nodes shown in FIGS. 2, 3, 4A, 5A, 6, and/or 7. All components need not be used in various embodiments. For example, each of the clients, servers, and network resources of the distributed processing system may each use a different set of components, or in the case of servers or mainframes, for example, larger storage devices.

One example processing system, in the form of a computer 800, may include a processing unit 802, memory 803, removable storage 810, and non-removable storage 812, communicatively coupled by a bus 801. The processing unit 802 may be a single core or multi-core device. Although the example processing system is illustrated and described as computer 800, the processing system may be in different forms in different embodiments. For example, the processing system may instead be a smartphone, a tablet, smartwatch, or other processing device including the same or similar elements as illustrated and described with regard to FIG. 8. Devices, such as smartphones, tablets, and smartwatches, are generally collectively referred to as mobile devices or user equipment. Further, although the various data storage elements are illustrated as part of the processing system 800, the storage may also or alternatively include cloud-based storage accessible via a network, such as a local area network (LAN), a personal area network, (PAN) a wide area network (WAN) such as the Internet, or local server based storage.

Memory 803 may include volatile memory 814 and non-volatile memory 808. Computer 800 may include—or have access to a processing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer 800 may include or have access to a processing environment that includes input interface 806, output interface 804, and a communication connection or interface 816, also communicatively coupled to the bus 801. Output interface 804 may include a display device, such as a touchscreen, that also may serve as an input device coupled to the input interface 806. The input interface 806 may include one or more of a touchscreen, touchpad, mouse, keyboard, camera, one or more device-specific buttons, one or more sensors integrated within or coupled via wired or wireless data connections to the processing system 800, and other input devices. The computer 800 may operate in a networked environment using a communication connection to connect to one or more remote computers, such as mainframes and/or database servers. The remote computer may include a personal computer (PC), server, router, network PC, a peer device or other common network node, or the like. The communication connection may include a local area network (LAN), a wide area network (WAN), cellular, Wi-Fi, Bluetooth, or other networks.

Computer-readable instructions or applications 818 stored on a computer-readable medium are executable by the processing unit 802 of the computer 800. A hard drive, CD-ROM, and RAM are some examples of articles including a non-transitory computer-readable medium such as a storage device. The terms computer-readable medium and storage device do not include carrier waves to the extent carrier waves are deemed too transitory. For example, one or more applications 818 may be used to cause processing unit 802 to perform one or more methods or algorithms described herein.

What is claimed is:

1. A protocol independent network condition service (PINCS) apparatus, comprising:
    a non-transitory memory storage comprising instructions; and
    one or more processors in communication with the memory, wherein the one or more processors execute the instructions to:
        receive a subscription for network condition information of at least one network from at least one network condition consumer (NCC) node, the network condition information being related to at least one target data flow provided to at least one node in the network via the NCC node;
        obtain information about a plurality of network conditions from at least one network condition provider (NCP) node configured to monitor the plurality of network conditions including network conditions related to the at least one target data flow;
        process the information about the plurality of network conditions to generate aggregated network conditions information; and
        send the aggregated network conditions information to the NCC node as indicated by the subscription.

2. The PINCS apparatus of claim 1, wherein the information about the plurality of network conditions includes information concerning multiple data flows, including the at least one target data flow, the multiple data flows operating according to a plurality of protocols.

3. The PINCS apparatus of claim 1, wherein the network condition information includes at least one of: a radio bandwidth, a round trip time (RTT), a bearer queue length, a flow queue length, a bearer queue depletion rate, or a flow queue depletion rate.

4. The PINCS apparatus of claim 1, wherein the one or more processors are configured to receive respective subscriptions from a plurality of NCC nodes related to a respective plurality of data flows and to obtain the information about the plurality of network conditions from a plurality of NCP nodes.

5. The PINCS apparatus of claim 1, wherein the one or more processors are a component of a network exposure function of a fifth generation (5G) system.

6. The PINCS apparatus of claim 1, wherein the one or more processors are coupled to a mobile edge computing (MEC) system including a MEC server and the one or more processors and the MEC server are in separate locations.

7. The PINCS apparatus of claim 1, wherein:
    the one or more processors are coupled to a mobile edge computing (MEC) system including a MEC server; and
    the one or more processors and the MEC server are co-located.

8. The PINCS apparatus of claim 1, wherein the one or more processors are configured to receive side information from a Node B, the side information including at least one of: throughput, loss, queue length, average queue depletion rate, delay or radio channel and quality of service (QoS) aware segmentation of both momentary cell capacity and S1 interface.

9. A network condition consumer (NCC) apparatus, comprising:
    a non-transitory memory storage comprising instructions; and
    one or more processors in communication with the memory, wherein the one or more processors execute the instructions to:
        send a subscription for network condition information of at least one network to a protocol independent network condition service (PINCS) node, the network condition information being related to at least one target data flow provided to at least one node in the network by a source node coupled to the NCC apparatus;
        obtain, from the PINCS node, information about a plurality of network conditions as indicated in the subscription; and
        apply the information about the plurality of network conditions to control network congestion and to reduce latency for the at least one target data flow from the source node.

10. The NCC apparatus of claim 9, wherein the NCC apparatus is collocated with the source node and the one or more processors are configured to implement the congestion control in network transport.

11. The NCC apparatus of claim 9, wherein the one or more processors are configured to implement rate control.

12. The NCC apparatus of claim 9, wherein the one or more processors are configured to implement buffer control.

13. The NCC apparatus of claim 9, wherein the NCC apparatus is separate from the source node and the one or more processors are configured to send the information about the plurality of network conditions to the source node using in-band signaling.

14. The NCC apparatus of claim 9, wherein the NCC apparatus is separate from the source node and the one or more processors are configured to send the information about the plurality of network conditions to the source node using out-of-band signaling.

15. The NCC apparatus of claim 9, wherein the network conditions in the subscription include at least one of: a radio bandwidth, a round trip time (RTT), a bearer queue length, a flow queue length, a bearer queue depletion rate, or a flow queue depletion rate.

16. A method for implementing a Protocol Independent Network Condition Service (PINCS), the method comprising:
    receiving a subscription for network condition information of at least one network from at least one network condition consumer (NCC) node, the network condition information being related to at least one target data flow provided to at least one node in the network via the NCC node;
    obtaining information about a plurality of network conditions from at least one network condition provider (NCP) node configured to monitor the plurality of network conditions including network conditions related to the at least one target data flow;
    process the information about the plurality of network conditions to generate aggregated network conditions information; and
    send the aggregated network conditions information to the NCC node as indicated by the subscription.

17. The method of claim 16, wherein the information about the plurality of network conditions includes information concerning multiple data flows, the multiple data flows operating according to a plurality of protocols.

18. The method of claim 16, wherein the network condition information includes at least one of radio bandwidth, round trip time (RTT), bearer queue length, flow queue length, bearer queue depletion rate, or flow queue depletion rate.

19. The method of claim 16, comprising:
    receiving respective subscriptions from a plurality of NCC nodes related to a respective plurality of target data flows;
    receiving the information about the plurality of network conditions from a plurality of NCP nodes; and
    maintaining the information about the plurality of network conditions received from the plurality of NCP nodes.

* * * * *